United States Patent
Takeda et al.

(10) Patent No.: US 9,185,724 B2
(45) Date of Patent: Nov. 10, 2015

(54) APERIODIC CHANNEL STATE INFORMATION REPORTING METHOD, RADIO BASE STATION APPARATUS AND USER TERMINAL

(75) Inventors: Kazuaki Takeda, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 153 days.

(21) Appl. No.: 13/985,053

(22) PCT Filed: Feb. 7, 2012

(86) PCT No.: PCT/JP2012/052776
§ 371 (c)(1),
(2), (4) Date: Sep. 3, 2013

(87) PCT Pub. No.: WO2012/111488
PCT Pub. Date: Aug. 23, 2012

(65) Prior Publication Data
US 2013/0336273 A1    Dec. 19, 2013

(30) Foreign Application Priority Data
Feb. 14, 2011 (JP) ................................ 2011-029142

(51) Int. Cl.
*H04W 72/14* (2009.01)
*H04L 1/00* (2006.01)
*H04L 5/00* (2006.01)
*H04W 24/10* (2009.01)

(52) U.S. Cl.
CPC ............. *H04W 72/14* (2013.01); *H04L 1/0027* (2013.01); *H04L 5/0057* (2013.01); *H04L 1/0026* (2013.01); *H04L 5/001* (2013.01); *H04W 24/10* (2013.01)

(58) Field of Classification Search
None
See application file for complete search history.

(56) References Cited

U.S. PATENT DOCUMENTS

2011/0249578 A1* 10/2011 Nayeb Nazar et al. ........ 370/252
2012/0147831 A1* 6/2012 Golitschek ................... 370/329

OTHER PUBLICATIONS

International Search Report in corresponding International Application No. PCT/JP2012/052776 mailed Mar. 6, 2012 (4 page).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

(Continued)

*Primary Examiner* — Kodzovi Acolatse
(74) *Attorney, Agent, or Firm* — Osha Liang LLP

(57) ABSTRACT

The present invention is designed such that, when a user terminal performs radio communication using a plurality of serving cells of different component carriers, it is possible to flexibly report aperiodic channel state information of a serving cell required on the network side among the plurality of serving cells. A radio base station apparatus transmits an uplink scheduling grant, which includes an identification field that identifies an uplink serving cell where an uplink shared channel is allocated among a plurality of uplink serving cells and a request field that requests reporting of aperiodic channel state information from a user terminal, to the user terminal, via a downlink control channel, and the user terminal reports aperiodic channel state information of a downlink serving cell that is designated by a combination of the identification field and the request field, to the radio base station apparatus, via the uplink shared channel.

9 Claims, 13 Drawing Sheets

| CIF | CELL INDEX FOR PDSCH AND PUSCH TRANSMISSION | APERIODIC CSI TRIGGERING | DL CELL FOR CSI TRIGGERING |
|---|---|---|---|
| 000 | CELL #0 | 01 | CELL #0 |
| | | 10 | CELL #1 |
| | | 11 | CELL #0 & CELL#1 |
| 001 | CELL #1 | 01 | CELL #1 |
| | | 10 | CELL #0 |
| | | 11 | CELL #0 & CELL#1 |
| 010 | RESERVED | | |
| 011 | RESERVED | | |
| 100 | RESERVED | | |
| 101 | RESERVED | | |
| 110 | RESERVED | | |
| 111 | RESERVED | | |

IN CASE OF CIF = "000" and A-CSI = "10," A-CSI FOR DL CELL #1 IS REPORTED BY PUSCH

(56) References Cited

OTHER PUBLICATIONS

3GPP TS 36.212 V9.3.0; "3rd Generation Partnership Project; Technical Specification Group Radio Access Network; Evolved Universal Terrestrial Radio Access (E-UTRA); Multiplexing and channel coding (Release 9)"; Sep. 2010 (61 pages).

LG Electronics; "DL CC selection for aperiodic CSE triggering"; 3GPP TSG RAN WG1 #63, R1-106134; Jacksonville, USA, Nov. 15-19, 2010 (5 pages).

Pantech; "On aperiodic CSI triggering for CA"; 3GPP TSG-RAN WG1 #63bis, R1-110155; Dublin, Ireland, Jan. 17-21, 2011 (3 pages).

Japanese Office Action issued in Japanese Patent Application No. 2011-029142, mailing date Nov. 19, 2013, with English translation thereof (4 pages).

* cited by examiner

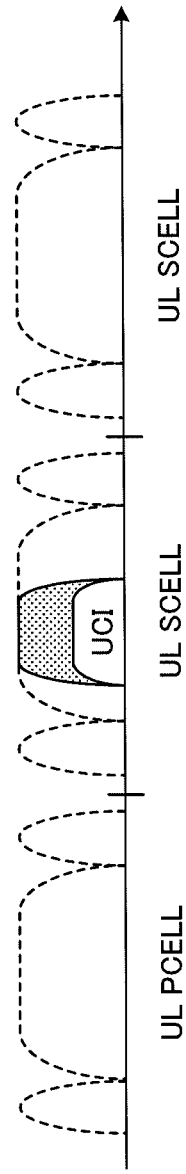
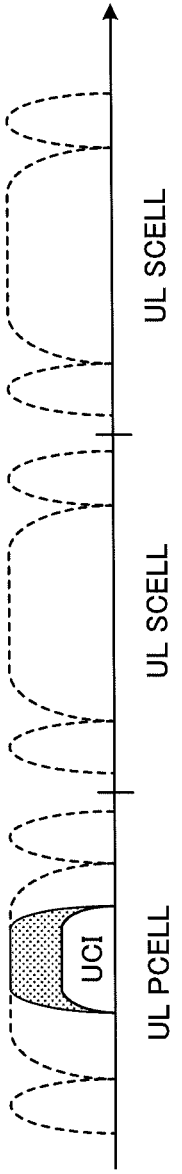

| VALUE OF CSI REQUEST FIELD | DESCRIPTION |
|---|---|
| '00' | NO CSI REPORT IS TRIGGERED |
| '01' | [CSI IS REPORTED FOR SERVING CELL] |
| '10' | CSI IS REPORTED FOR A 1ST SET OF SERVING CELLS CONFIGURED BY HIGHER LAYERS |
| '11' | CSI IS REPORTED FOR A 2ND SET OF SERVING CELLS CONFIGURED BY HIGHER LAYERS |

| CIF | CELL INDEX |
|---|---|
| 000 | CELL#0 (PRIMARY CELL) |
| 001 | CELL #1 |
| 010 | CELL #2 |
| 011 | CELL #3 |
| 100 | CELL #4 |
| 101 | RESERVED |
| 110 | RESERVED |
| 111 | RESERVED |

IN CELL #0, FLEXIBLE CSI REPORTING IS POSSIBLE

| CIF | CELL INDEX FOR PDSCH AND PUSCH TRANSMISSION | APERIODIC CSI TRIGGERING | DL CELL FOR CSI TRIGGERING |
|---|---|---|---|
| 000 | CELL #0 | 10 | CELL #1 |
|     |         | 11 | CELL #2, #3, #4 |
| 001 | CELL #1 | 10 | CELL #2 |
|     |         | 11 | CELL #3, #4, #0 |
| 010 | CELL #2 | 10 | CELL #3 |
|     |         | 11 | CELL #4, #0, #1 |
| 011 | CELL #3 | 10 | CELL #4 |
|     |         | 11 | CELL #0, #1, #2 |
| 100 | CELL #4 | 10 | CELL #0 |
|     |         | 11 | CELL #0, #1, #2, #3 |
| 101 | CELL #0 | 10 | CELL #2 |
|     |         | 11 | CELL #3 |
| 110 | CELL #0 | 10 | CELL #4 |
|     |         | 11 | CELL #0, #1 |
| 111 | CELL #0 | 10 | CELL #0, #1, #2 |
|     |         | 11 | CELL #0, #1, #2, #3, #4 |

FIG. 7

- IN CELL #0, CELL #1 AND CELL #2, FLEXIBLE CSI REPORTING IS POSSIBLE

| CIF | CELL INDEX FOR PDSCH AND PUSCH TRANSMISSION | APERIODIC CSI TRIGGERING | DL CELL FOR CSI TRIGGERING |
|---|---|---|---|
| 000 | CELL #0 | 10 | CELL #1 |
| 001 | CELL #1 | 11 | CELL #2, #3, #4 |
| 010 | CELL #2 | 10 | CELL #2 |
| 011 | CELL #3 | 11 | CELL #3, #4, #0 |
| 100 | CELL #4 | 10 | CELL #3 |
|  |  | 11 | CELL #4, #0, #1 |
|  |  | 10 | CELL #4 |
|  |  | 11 | CELL #0, #1, #2 |
|  |  | 10 | CELL #0 |
|  |  | 11 | CELL #0, #1, #2, #3 |
| 101 | CELL #0 | 10 | CELL #0, #1 |
|  |  | 11 | CELL #0, #1, #2, #3, #4 |
| 110 | CELL #1 | 10 | CELL #1, #2 |
|  |  | 11 | CELL #0, #1, #2, #3, #4 |
| 111 | CELL #2 | 10 | CELL #2, #3 |
|  |  | 11 | CELL #0, #1, #2, #3, #4 |

FIG. 9

APERIODIC CHANNEL STATE INFORMATION REPORTING METHOD, RADIO BASE STATION APPARATUS AND USER TERMINAL

TECHNICAL FIELD

The present invention relates to an aperiodic channel state information reporting method, a radio base station apparatus and a user terminal in a next-generation radio communication system.

BACKGROUND ART

In the UMTS (Universal Mobile Telecommunications System) network, for the purposes of further increasing high-speed data rates, providing low delay and so on, long-term evolution (LTE) has been under study (Non-Patent Literature 1). In LTE, as multiplexing schemes, a scheme that is based on OFDMA (Orthogonal Frequency Division Multiple Access) is used on the downlink, and a scheme that is based on SC-FDMA (Single Carrier Frequency Division Multiple Access) is used on the uplink.

In the LTE system, uplink signals are mapped to adequate radio resources and transmitted from a user terminal to a radio base station apparatus. To be more specific, uplink user data is transmitted using an uplink shared channel (PUSCH: Physical Uplink Shared Channel). Also, the PUSCH is used when uplink control information (UCI) is transmitted with uplink user data, and an uplink control channel (PUCCH: Physical Uplink Control Channel) is used when uplink control information alone is transmitted.

In uplink control information (UCI), a delivery acknowledgment (ACK/NACK) in response to a downlink shared channel (PDSCH: Physical Downlink Shared Channel)), a scheduling request, channel state information (CSI) and so on are included (see, for example, non-patent literature 2). The channel state information (hereinafter referred to as "CSI") is information that is based on the instantaneous downlink channel state, and includes, for example, channel quality information (CQI), the precoding matrix indicator (PMI), the rank indicator (RI) and so on. This CSI is reported from the user terminal to the radio base station apparatus periodically or aperiodically.

In response to a trigger from the radio base station apparatus, aperiodic channel state information (aperiodic CSI) is reported from the user terminal to that radio base station. This trigger (aperiodic CSI triggering) is included in an uplink scheduling grant (hereinafter referred to as "UL (uplink) grant") (DCI format 0/4) that is transmitted in a downlink control channel (PDCCH: Physical Downlink Control Channel). The user terminal reports the aperiodic channel state information (hereinafter referred to as "A-CSI") using the PUSCH designated by the UL grant, in accordance with the trigger included in the UL grant. Such reporting of A-CSI is also referred to as "aperiodic channel state information reporting" (aperiodic CSI (CQI/PMI/RI) reporting).

CITATION LIST

Non-Patent Literature

Non-Patent Literature 1: 3GPP, TR25.912 (V7.1.0), "Feasibility study for Evolved UTRA and UTRAN," September 2006

Non-Patent Literature 2: 3GPP, TS36.212 (V.9.3.0), "Multiplexing and channel coding," November 2010

SUMMARY OF INVENTION

Technical Problem

Now, in 3GPP, successor systems of LTE are being studied for the purpose of realizing further broadbandization and faster speed (for example, LTE-Advanced (LTE-A)). In the LTE-A system, it is preferable to realize broadbandization while maintaining backward compatibility with the LTE system. So, in the LTE-A system, using fundamental frequency blocks (component carriers (CCs) having a band which can be used in the LTE system (for example, 20 MHz) and combining a plurality of component carriers to realize broadbandization (for example, 100 MHz, if five CCs are combined), are under study.

In this LTE-A system, at least one cell is provided for one component carrier (CC), and the user terminal is configured to be able to communicate in a plurality of cells of different component carriers (CCs). Note that one cell where the user terminal communicates primarily among individual component carriers (CCs) is also referred to as a "serving cell." In this way, in the LTE-A system, the user terminal performs radio communication in a plurality of serving cells of different component carriers, thereby realizing broadbandization of the system band.

In this LTE-A system, when the user terminal performs radio communication in a plurality of serving cells of different component carriers (CCs), the conditions of communication such as the interference level vary per serving cell. Consequently, in the LTE-A system, there is a need, when the above-described aperiodic channel state information reporting (aperiodic CSI reporting) is performed, to make it possible to flexibly report aperiodic channel state information (A-CSI) of a downlink serving cell required on the network side among a plurality of serving cells.

The present invention is made in view of the above, and it is therefore an object of the present invention to provide an aperiodic channel state information reporting method, a radio base station apparatus and a user terminal, whereby, when a user terminal performs radio communication using a plurality of serving cells of different component carriers, it is possible to flexibly report aperiodic channel state information of a downlink serving cell required on the network side among the plurality of serving cells.

Solution to Problem

The aperiodic channel state reporting method according to the present invention includes the steps of: transmitting, from a radio base station apparatus to a user terminal, an uplink scheduling grant, which includes an identification field that identifies an uplink serving cell where an uplink shared channel is allocated among a plurality of uplink serving cells and a request field that requests reporting of aperiodic channel state information from the user terminal, via a downlink control channel; and reporting aperiodic channel state information of a downlink serving cell designated by a combination of the identification field and the request field, from the user terminal to the radio base station apparatus, via the uplink shared channel.

According to this configuration, when a user terminal performs radio communication in a plurality of serving cells of different component carriers, it is possible to designate a downlink serving cell by a larger number of combinations using an identification field and a request field, so that the user terminal is able to flexibly report aperiodic channel state information of a downlink serving cell required on the network side.

The radio base station apparatus according to the present invention has: a generating section configured to generate an uplink scheduling grant, which includes an identification field that identifies an uplink serving cell where an uplink shared channel is allocated among a plurality of uplink serving cells and a request field that requests reporting of aperiodic channel state information from a user terminal, via a downlink control channel; and a transmission section configured to transmit the uplink scheduling grant to the user terminal via a downlink control channel, and, in this radio base station apparatus, the generating section is configured to designate at least one downlink serving cell, aperiodic channel state information of which needs to be reported from the user terminal, by a combination of the identification field and the request field.

The user terminal according to the present invention has: a receiving section configured to receive, from a radio base station apparatus, an uplink scheduling grant, which includes an identification field that identifies an uplink serving cell where an uplink shared channel is allocated among a plurality of uplink serving cells and a request field that requests reporting of aperiodic channel state information from the user terminal, via a downlink control channel; and a transmission section configured to report aperiodic channel state information of a downlink serving cell designated by a combination of the identification field and the request field, via the uplink shared channel.

Advantageous Effects of Invention

According to the present invention, when a user terminal performs radio communication in a plurality of serving cells of different component carriers, it is possible to flexibly report aperiodic channel state information of a downlink serving cell required on the network side among the plurality of serving cells.

BRIEF DESCRIPTION OF DRAWINGS

FIG. 2 is a diagram to show an example of an uplink control information transmission method in an LTE-A system;

FIG. 7 is a diagram for explaining an aperiodic channel state information reporting method according to the present invention;

FIG. 9 is a diagram for explaining an aperiodic channel state information reporting method according to the present invention;

DESCRIPTION OF EMBODIMENTS

Figure 1B:
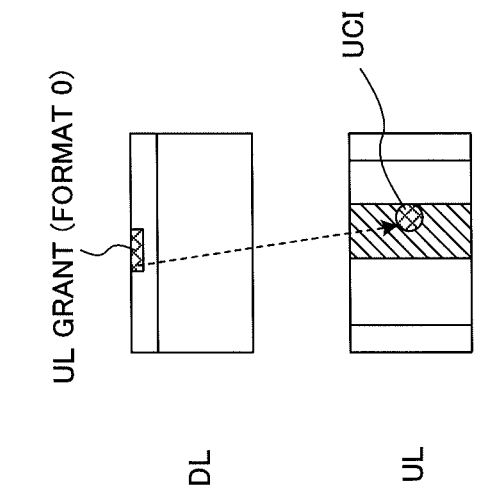
FIG. 1 is a diagram to show an example of an uplink control information transmission method in an LTE system.
Figure 1A:
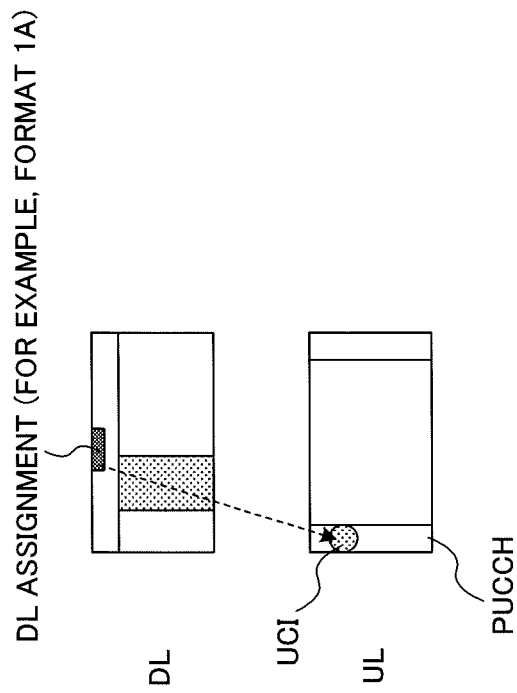

FIG. 1 is a diagram to show an example of an uplink control information transmission method in the LTE system. As described above, when there is no uplink user data, uplink control information (UCI) is transmitted via the uplink control channel (PUCCH) (see FIG. 1A).

Meanwhile, when an uplink scheduling grant (UL grant) (DCI format 0/4) is transmitted via the downlink control channel (PDCCH) (that is, when there is uplink user data), uplink control information (UCI) is transmitted with uplink user data via the uplink shared channel (PUSCH) designated by the UL grant (see FIG. 1B).

For example, since a trigger for aperiodic channel state information reporting (hereinafter referred to as "A-CSI trigger") is included in the UL grant (DCI format 0/4), aperiodic channel state information (A-CSI), which is one type of uplink control information (UCI), is transmitted via the PUSCH that is associated with the UL grant.

FIG. 2 is a diagram to show an example of an uplink control information transmission method in the LTE-A system. In the LTE-A system, broadbandization is made possible by combining a plurality of component carriers (CCs), so that a user terminal is configured to be able to communicate in a plurality of serving cells of different component carriers. On the other hand, in uplink transmission in the LTE-A system, applying the SC-FDMA radio access scheme is under study. Consequently, in uplink transmission, it is preferable to transmit from a single CC (that is, from a single serving cell) in order to maintain the characteristics of uplink single-carrier transmission.

When uplink transmission is carried out using a single CC, to transmit uplink control information (UCI), selecting the serving cell of a specific CC is requested. For example, when UCI is transmitted via the PUCCH, the serving cell of the PCC (Primary Component Carrier) by which the PUCCH is transmitted is selected. On the other hand, when UCI is transmitted via the PUSCH with user data, the serving cell of the CC associated with the UL grant is selected.

To be more specific, as shown in FIG. 2A, when reporting of A-CSI from the user terminal is requested (when an A-CSI trigger is included in a UL grant), the serving cell of an SC (Secondary Component Carrier) (also referred to as "S cell") that is associated with the UL grant is selected, and, using the selected SC, UCI to include A-CSI is transmitted. On the other hand, as shown in FIG. 2B, when reporting of A-CSI from the user terminal is not requested, the serving cell of the PCC (also referred to as "P cell") is selected, and, using the selected P cell, UCI is transmitted.

Also, in the LTE-A system, when the user terminal performs radio communication in a plurality of serving cells of different CCs, the conditions of communication such as the interference level vary per serving cell. Consequently, in aperiodic channel state information reporting (aperiodic CSI reporting), it is preferable to make it possible to flexibly report A-CSI of a downlink serving cell required on the network side among a plurality of serving cells.

Figure 3:
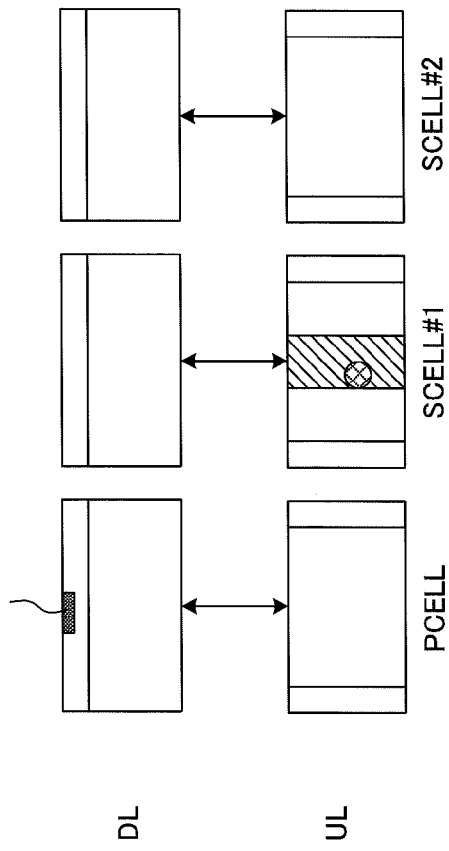
FIG. 3 is a diagram to show an example of an A-CSI reporting method in the LTE-A system.

FIG. 3 is a diagram to show an example of an A-CSI transmission method in the LTE-A system. As shown in FIG. 3, to designate at least one downlink serving cell on the network side, it may be possible to add bit information that designates a predetermined serving cell, in addition to an A-CSI trigger, to a UL grant (DCI format 0/4). For example, as shown in FIG. 3, there is ongoing study to designate as to which serving cell's A-CSI should be reported, in addition to whether or not A-CSI needs to be reported, by adding one bit to the existing A-CSI trigger field (one bit).

For example, in FIG. 3, when the value of the two-bit A-CSI trigger field (also referred to as "CSI request field") is "00," this means that "A-CSI is not transmitted." Also, when the A-CSI trigger field value is "01," this means that "A-CSI with respect to a serving cell of a downlink CC corresponding to an uplink CC associated with a UL grant is transmitted." Also, when the A-CSI trigger field value is "10," this means that "A-CSI with respect to at least one serving cell designated as the first set by higher layer signaling is transmitted." Also, when the A-CSI trigger field value is "11," this means that "A-CSI with respect to at least one serving cell designated as a second set by higher layer signaling is transmitted."

In the above-described example, by reporting at least one downlink serving cell constituting the first set and the second set by higher control signals using higher layer signaling (for example, RRC signaling), two types of reporting patterns are realized when the A-CSI trigger field value is "10" and "11."

For example, assume that, when the user terminal uses two serving cells (cell #0 and #1), cell #0 is reported as the first set and cell #1 is reported as a second set in advance, by higher control signals. In this case, when the A-CSI trigger field value included in a UL grant (format 0/4) is "10," the user terminal reports A-CSI of cell #0 of the first set to the radio base station apparatus. On the other hand, when the A-CSI trigger field value is "11," the user terminal reports A-CSI of cell #1 of the second set.

Also, assume that, when the user terminal uses two serving cells (cell #0 and cell #1), cell #0 is reported as the first set and cell #0 and cell #1 are reported as a second set, in advance, by higher control signals. In this case, when the A-CSI trigger field value included in a UL grant (format 0/4) is "10," the user terminal reports A-CSI of cell #0 of the first set to the radio base station apparatus. On the other hand, when the A-CSI trigger field value is "11," the user terminal reports A-CSIs of cell #0 and cell #1 of the second set (see FIG. 4).

Also, assume that, when the user terminal uses five serving cells (cell #0 to cell #4), cell #0 and cell #1 are reported as the first set, and cell #2, cell #3 and cell #4 are reported as a second set, in advance, by higher control signals. In this case, when the A-CSI trigger field value included in a UL grant (format 0/4) is "10," the user terminal reports A-CSIs of cell #0 and cell #1 of the first set to the radio base station apparatus. On the other hand, when the A-CSI trigger field value is "11," the user terminal report A-CSIs of cell #2, cell #3 and cell #4 of the first set.

However, in the above-described example, the downlink serving cells, the A-SCI of which needs to be reported from the user terminal, can be designated only in two types of reporting patterns. Consequently, there is a problem that, when, for example, the user terminal uses five serving cells, even if the network side requests reporting of A-CSI of cell #1 alone, it is necessary to report A-CSIs of two cells, cell #0 and cell #1, and therefore the overhead of the PUSCH to report the A-CSI increases.

Now, in the LTE-A system, a method to transmit allocation information (DL grant/UL grant) of the PDSCH/PUSCH used in a plurality of serving cells by the PDCCH of one serving cell, is under study. In this way, the method of transmitting allocation information of the PDSCH/PUSCH used in a plurality of serving cells by the serving cell (for example, P cell) of one CC is also referred to as "cross-carrier scheduling."

In such cross-carrier scheduling, it is necessary to identify to which serving cell the PDSCH/PUSCH are allocated. So, including a carrier indicator field (CIF), which identifies the serving cell where the PDSCH/PUSCH are allocated (hereinafter referred to as "CIF"), in a DL grant/UL grant, is under study.

Figures 4, 5:
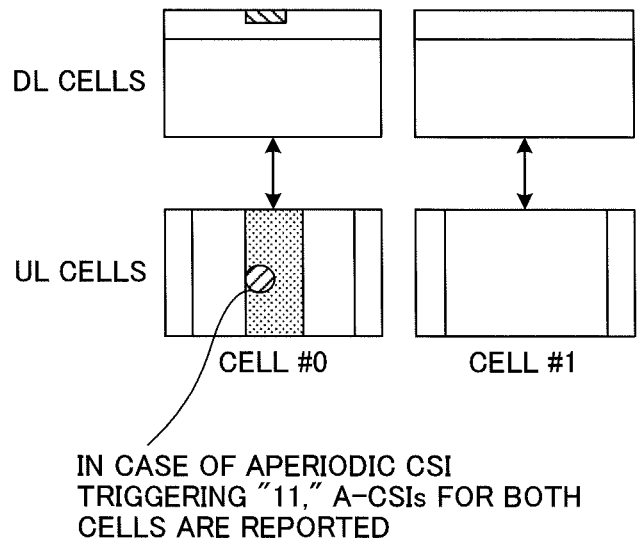
FIG. 4 is a diagram to show an example of an A-CSI reporting method in the LTE-A system.
FIG. 5 is a diagram to show an example of a CIF used in cross-carrier scheduling in the LTE-A system.

FIG. 5 is a diagram to show an example of the CIF used in cross-carrier scheduling in the LTE-A system. Note that FIG. 5 assumes a case where five serving cells (cell #0 to cell #4) are used. As shown in FIG. 5, the CIF is a bit sequence of three bits. When the CIF value is "000," this means that the PDSCH/PUSCH are allocated to cell #0 (P cell). The same applies to cases where the CIF value is "001," "010," "011" and "100."

Note that the CIF included in a DL grant means that the PDSCH is allocated to the serving cell identified by that CIF. Meanwhile, the CIF included in a UL grant means that the PUSCH is allocated to the serving cell identified by that CIF. For example, when the CIF included in a DL grant that is received is "000," the user terminal demodulates the PDSCH allocated to cell #0 using the DL grant. On the other hand, when the CIF include in a UL grant that is received is "000," the user terminal transmits uplink data via the PUSCH allocated to cell #0.

Now, assume that, in the LTE-A system, the user terminal uses maximum five serving cells. Consequently, among eight CIF values, three values (in FIG. 5, "101," "110" and "111") are not used. The present inventor has focused on the fact that there are values of the CIF that are not used, and arrived at designating A-CSI of a serving cell that is required on the network side by a combination of this CIF and the A-CSI trigger field.

With the aperiodic channel state reporting method according to the present invention, a radio base station apparatus transmits an uplink scheduling grant (UL grant), which includes an identification field (CIF) that identifies an uplink serving cell where the uplink shared channel (PUSCH) is allocated among a plurality of uplink serving cells, and a request field (A-CSI trigger field) that requests reporting of aperiodic channel state information (A-CSI) from a user terminal, to the user terminal, via the downlink control channel (PDCCH), and the user terminal reports A-CSI of a downlink serving cell designated by a combination of the identification field (CIF) and the request field (A-CSI trigger field), to the radio base station apparatus.

By this means, when a user terminal performs radio communication in a plurality of serving cells of different component carriers (CCs), the radio base station apparatus is able to designate a downlink serving cell by a larger number of combinations using the identification field (CIF) and the request field (A-CSI trigger field), so that the user terminal is able to flexibly report aperiodic channel state information (A-CSI) of a downlink serving cell that is required on the network side.

Also, with the aperiodic channel state reporting method according to the present invention, when the PUSCH is allocated to an uplink serving cell that is designated by the CIF, using the A-CSI trigger field, at least one downlink serving cell, the A-CSI of which should be reported from user terminal, is designated. Furthermore, with the aperiodic channel state reporting method according to the present invention, the radio base station apparatus designates at least one uplink serving cell, among a plurality of uplink serving cells, redundantly, using the CIF.

By this means, at least one uplink serving cell is designated redundantly using the CIF, so that, when the PUSCH is allocated to the uplink serving cell designated redundantly, it is possible to designate the serving cell, the A-CSI of which needs to be reported, by a larger number of combinations, using the A-CSI trigger field.

Note that, as will be described later, designation by way of a combination of the CIF and the A-CSI trigger field is realized by a mapping table such as ones shown in FIG. 6, FIG. 7 and FIG. 9. In this mapping table, CIF values and identification information of uplink serving cells where the PUSCH is allocated are mapped, and also A-CSI trigger field values and at least one downlink serving cell, the A-CSI of which needs to be reported, are mapped. As a result of this, when the PUSCH is allocated to an uplink serving cell identified by the CIF, at least one downlink serving cell, the A-CSI of which needs to be reported, is designated by the value of the A-CSI trigger field.

More particularly, in FIG. 7 and FIG. 9, at least one uplink serving cell is allocated to CIF values that are originally not used ("101," "110" and "111"), redundantly. In this way, when at least one uplink serving cell is allocated to a plurality of values of the CIF, it is possible to increase the A-CSI reporting patterns to be used when the PUSCH is allocated to the uplink serving cells. As an uplink serving cell to be allocated to a plurality of values of the CIF, an uplink serving cell of high significance, such as, for example, the P cell, a serving cell where the number of times the PUSCH is allocated is high, and so on, is preferable. This is because, when the PUSCH is allocated to an uplink serving cell of high significance, the variations of A-CSI of a downlink serving cell required on the network side also increase. In this way, by allocating an uplink serving cell of high significance to a plurality of values of the CIF, it is possible to increase the A-CSI reporting patterns without increasing the number of bits of the A-CSI trigger field.

Although, in the following description, an example will be described where the CIF is three bits, the number of bits of the CIF is by no means limited to this. Similarly, although an example will be shown where the A-CSI trigger field is two bits, the number of bits of the A-CSI trigger field is not limited to this either. Note that, in the following description, any serving cell can be allocated to CIF values, and the allocations of values shown in FIGS. 6 to 9 are only examples. Similarly, to the values of the A-CSI trigger field, at least one serving cell may be allocated in whatever combination, and the allocations of values shown in FIGS. 6 to 9 are only examples. Also, an uplink serving cell and a downlink serving cell may be physically different serving cells or may be one cell that is separated by functions.

Also, although, in the following description, a case will be described where the CIF and the A-CSI trigger field are included in a UL grant, this is by no means limiting. For example, a case where the CIF and the A-CSI trigger field are included in a DL grant is equally applicable.

<Case of Two Serving Cells>

Figure 6:
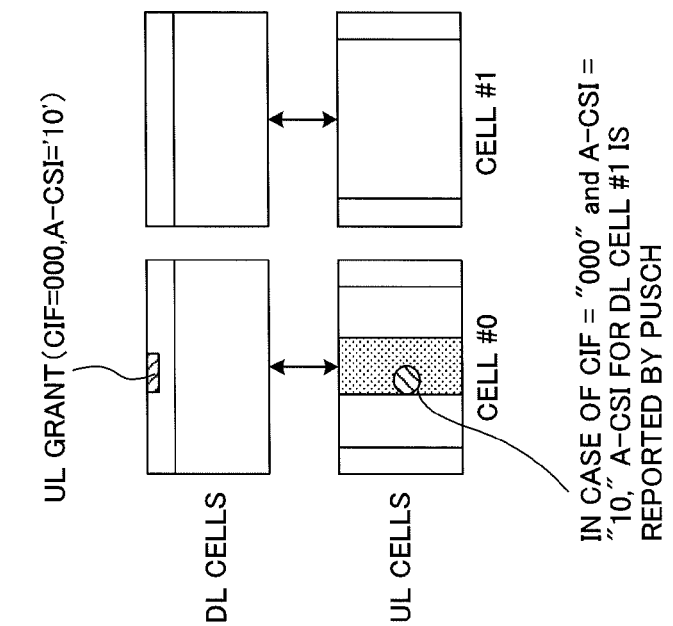
FIG. 6 is a diagram for explaining an aperiodic channel state information reporting method according to the present invention.

FIG. 6 is a diagram for explaining an aperiodic channel state information reporting method to be used when a user terminal uses two serving cells. FIG. 6 shows an example where a user terminal uses two serving cells, cell #0 and cell #1.

As shown in FIG. 6, the CIF value "000" means that the PUSCH is allocated to cell #0. When the PUSCH is allocated to cell #0, the A-CSI trigger field value "01" means that A-CSI of cell #0, where PUSCH is allocated, needs to be reported, and "10" means that A-CSI of cell #1 needs to be reported, and "11" means that A-CSI of both cell #0 and cell #1 need to be reported. Similarly, the CIF value "001" means that the PUSCH needs to be allocated to cell #1, and, when the PUSCH is allocated to cell #1, the serving cell, the A-CSI of which needs to be reported, is indicated by the value of the A-CSI trigger field.

When the user terminal uses two serving cells, in accordance with the allocation of the values of the CIF and the A-CSI trigger field shown in FIG. 6, when the PUSCH is allocated to a serving cell identified by the CIF, the radio base station apparatus designates the serving cell, the A-CSI of which needs to be reported from the user terminal, using the A-CSI trigger field.

For example, when the radio base station apparatus allocates the PUSCH for the user terminal to cell #0 and requests reporting of A-CSI of cell #1 to that user terminal, "000" is set in the CIF of the UL grant, and "10" is set in the A-CSI trigger field of the UL grant. The radio base station apparatus transmits the UL grant including the CIF and the A-CSI trigger field, to the user terminal, via the PDCCH.

When the user terminal receives, from the radio base station, the UL grant in which the CIF value is "000" and the A-CSI value is "10," via the PDCCH, the user terminal detects that the PUSCH is allocated to cell #0 and that the user terminal needs to report A-CSI of cell #1. The user terminal transmits A-CSI of cell #1 via the PUSCH allocated to cell #0.

As described above, when a user terminal uses two serving cells, the user terminal transmits A-CSI of at least one downlink serving cell that is designated by a combination of the CIF and the A-CSI trigger field included in a UL grant, via the PUSCH allocated to an uplink serving cell that is identified by the CIF. More particularly, in the example shown in FIG. 6, by combinations of the CIF and the A-CSI trigger field, it is possible to cover all the patterns to be used when the user terminal uses two serving cells. Consequently, the user terminal is able to reliably report A-CSI of at least one serving cell that is required on network side, in accordance with commands from the radio base station apparatus.

<Case of Five Serving Cells (First Example)>

Figure 8:
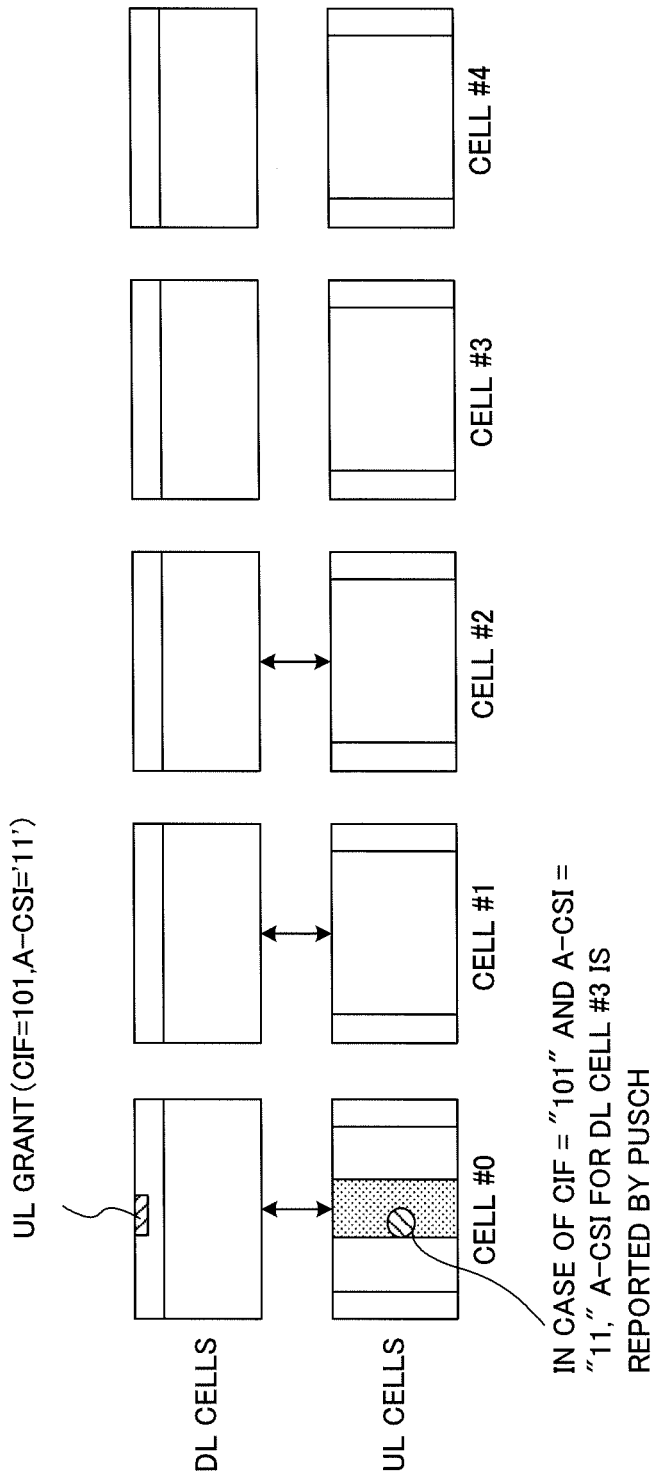
FIG. 8 is a diagram for explaining an aperiodic channel state information reporting method according to the present invention.

FIG. 7 and FIG. 8 are diagrams for explaining an aperiodic channel state information reporting method to be used when a user terminal uses five serving cells. FIG. 7 and FIG. 8 show examples where a user terminal uses five serving cells, cell #0 to cell #4. Also, FIG. 7 and FIG. 8 show examples where cell #0 is the serving cell (P cell) of the PCC of the user terminal.

As shown in FIG. 7, the CIF values "000" to "100" mean that the PUSCH is allocated to cell #0 to cell #4, respectively. Also, in FIG. 7, the CIF values "101" to "111" also mean that the PUSCH is allocated to cell #0. The A-CSI trigger field values "10" and "11" indicate at least one downlink serving cell, the A-CSI of which needs to be reported, when the PUSCH is allocated to the uplink serving cell identified by CIF.

When the PUSCH is allocated to a serving cell identified by the CIF in accordance with the allocation of CIF and A-CSI trigger field values shown in FIG. 7, the radio base station apparatus designates a downlink serving cell, the A-CSI of which needs to be reported from the user terminal, using the A-CSI trigger field. Note that the allocation information of CIF and A-CSI trigger field values shown in FIG. 7 may be reported in advance from the radio base station apparatus to the user terminal by higher control signals of higher layer signaling, or may be set in advance in both the radio base station apparatus and the user terminal.

Also, in FIG. 7, to the CIF values, among cell #0 to cell #4, cell #0, which is the P cell, is allocated redundantly. In the example shown in FIG. 7, when the PUSCH is allocated to cell #0, which is a P cell, the radio base station apparatus is able to designate cell #0, redundantly, using the CIF values "000," "101," "110" and "111." As a result of this, the radio base station apparatus is able to designate total eight combinations of serving cells, by combinations of the CIF values "000," "101," "110" and "111" and the A-CSI trigger field values "10" and "11."

For example, as shown in FIG. 8, when the radio base station apparatus allocates the PUSCH of the user terminal to cell #0 and requests the user terminal to report A-CSI of cell #3, "101" is set in the CIF of the UL grant, and also "11" is set in the A-CSI trigger field of the UL grant. The radio base station apparatus transmits that UL grant to the user terminal via the PDCCH.

Also, as shown in FIG. 8, when the user terminal receives the UL grant in which the CIF value is "101" and the A-CSI value is "11," the user terminal detects that the PUSCH is allocated to cell #0 and that the user terminal needs to report A-CSI of cell #3. The user terminal transmits A-CSI of cell #3 via the PUSCH allocated to cell #0.

As described above, when the PUSCH is allocated to the P cell (cell #0), the radio base station apparatus is able to designate downlink serving cells in total eight combinations, the A-CSI of which needs to be reported, by combinations of the CIF values "000," "101," "110" and "111" and the A-CSI trigger field values "10" and "11," as shown in FIG. 7. Consequently, by combinations of the CIF values "000" and the A-CSI trigger field values "10" and "11," compared to heretofore when downlink serving cells could be designated only in two combinations in total, it is possible to designate a downlink serving cell, the A-CSI of which needs to be reported, in a larger number of combinations.

In particular, the PUSCH is more likely to be allocated to the P cell. Consequently, by increasing the patterns to designate a downlink serving cell when the PUSCH is allocated to the P cell, the user terminal is able to flexibly report A-CSI of a downlink serving cell required on the network side.

<Five Serving Cells (Second Example)>

FIG. 9 is a diagram for explaining an aperiodic channel state information reporting method to be used when a user terminal uses five serving cells. FIG. 9 shows an example where a user terminal uses five serving cells, cell #0 to cell #4. Also, FIG. 9 shows an example where cell #0 is the serving cell (P cell) of the PCC of the user terminal. Note that the allocation information of CIF and A-CSI trigger field values shown in FIG. 9 may be reported in advance from the radio base station apparatus to the user terminal by higher control signals of higher layer signaling, or may be set in advance in both the radio base station apparatus and the user terminal.

Also, in FIG. 9, the CIF values "000" to "100" are allocated to cell #0 to cell #4, respectively. Also, in FIG. 9, the CIF value "101" means allocation to cell #0, "110" means allocation to cell #1, and "111" means allocation to cell #2. When the PUSCH is allocated to an uplink serving cell identified by the CIF value, the A-CSI trigger field values "10" and "11" indicate at least one downlink serving cell, the A-CSI of which needs to be reported.

Also, in FIG. 9, to the CIF values, among cell #0 to cell #4, cell #0, cell #1 and cell #2, which are P cells, are allocated redundantly. In the example shown in FIG. 9, when the PUSCH is allocated to cell #0, which is the P cell, the radio base station apparatus is able to designate cell #0 redundantly using the CIF values "000" and "101." As a result of this, the radio base station apparatus is able to designate total four combinations of serving cells by combinations of the CIF values "000" and "101" and the A-CSI trigger field values "10" and "11."

Similarly, in the example shown in FIG. 9, even when the PUSCH is allocated to cell #1, the radio base station apparatus is able to designate total four combinations of downlink serving cells by combinations of the CIF values "001" and "110" and the A-CSI trigger field values "10" and "11." Furthermore, even when the PUSCH is allocated to cell #2, the radio base station apparatus is able to designate total four combinations of downlink serving cells by combinations of the CIF values "110" and "111" and the CSI trigger field values "10" and "11."

As described above, in the case shown in FIG. 9, even when the PUSCH is allocated to any of cell #0, cell #1 and cell #2, the radio base station apparatus is able to designate four combinations of downlink serving cells. Consequently, compared to heretofore when downlink serving cells could be designated only in two combinations regardless of which uplink serving cell the PUSCH is allocated to, it is possible to designate at least one downlink serving cell in more flexible combinations.

Now, a mobile communication system 1 having a user terminal 10 and a radio base station apparatus 20 according to an embodiment of the present invention will be described below with reference to FIG. 10. The user terminal 10 and the radio base station apparatus 20 support LTE-A.

Figure 10:
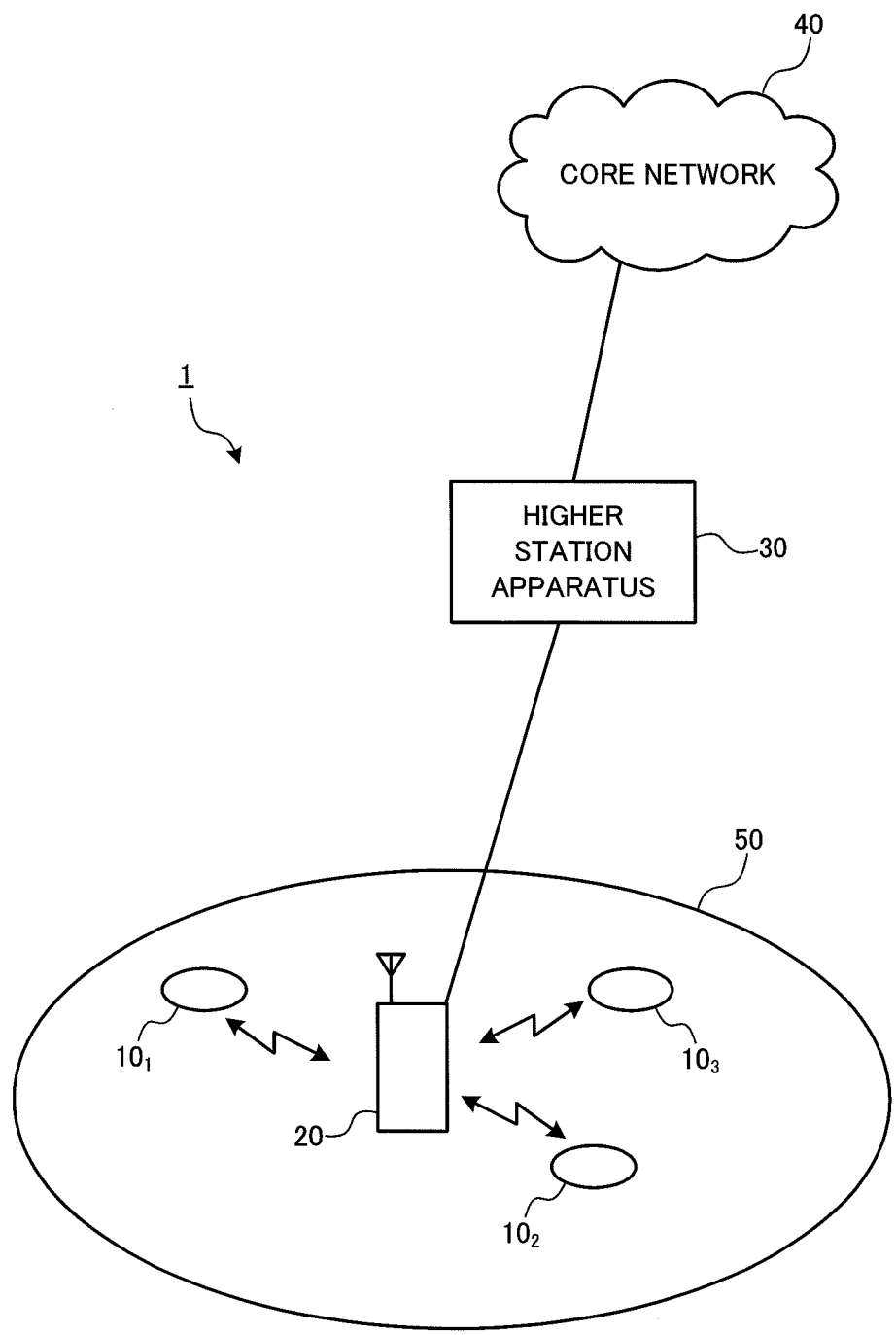
FIG. 10 is a diagram for explaining a configuration of a radio communication system according to an embodiment of the present invention.

As shown in FIG. 10, the mobile communication system 1 is configured to include a radio base station apparatus 20 and a plurality of user terminals 10 ($10_1$, $10_2$, $10_3$, . . . $10_n$, n, where n is an integer to satisfy n>0) that communicate with the radio base station apparatus 20. The radio base station apparatus 20 is connected with an higher station apparatus 30, and this higher station apparatus 30 is connected with a core network 40. The user terminals 10 are able to communicate with the radio base station apparatus 20 in a cell 50.

Note that the higher station apparatus 30 includes, for example, an access gateway apparatus, a radio network controller (RNC), a mobility management entity (MME) and so on, but is by no means limited to these. The higher station apparatus 30 may be included in the core network 40.

The user terminals ($10_1$, $10_2$, $10_3$, . . . $10_n$) are LTE-A terminals unless specified otherwise, but may also include LTE terminals as well. Also, although the user terminals 10 will be described to perform radio communication with the radio base station apparatuses 20 for ease of explanation, more generally, user apparatuses (UE: User Equipment) including mobile terminals and fixed terminals may be used as well.

In the mobile communication system 1, as radio access schemes, OFDMA (Orthogonal Frequency Division Multiple Access) is applied to the downlink. Meanwhile, on the uplink, SC-FDMA (Single-Carrier Frequency-Division Multiple Access) and clustered DFT-spread OFDM are applied.

OFDMA is a multi-carrier transmission scheme to perform communication by dividing a frequency band into a plurality of narrow frequency bands (subcarriers) and mapping data on each subcarrier. SC-FDMA is a single carrier transmission scheme to reduce interference between terminals by dividing, per terminal, the system band into bands formed with one or continuous resource blocks, and allowing a plurality of terminals to use mutually different bands. Clustered DFT-spread OFDM is a scheme to realize uplink multiple access by allocating groups (clusters) of discontinuous, clustered subcarriers to one user terminal UE and applying discrete Fourier transform spread OFDM to each cluster.

Here, the communication channels defined in LTE-A will be described. The downlink communication channels include the PDSCH, which is used by each user terminal 10 on a shared basis, and downlink L1/L2 control channels (including the PDCCH, PCFICH and PHICH). By means of the PDSCH, user data (including higher layer control signals), that is, normal data signals, is transmitted. Transmission data is included in this user data. Note that the fundamental frequency blocks (CC) allocated to the user terminal 10 in the radio base station apparatus 20 and scheduling information are reported to the user terminal 10 by the downlink control channel.

The higher control signals include RRC signaling to report the increase/decrease of the number of carrier aggregations, the uplink radio access schemes (SC-FDMA/clustered DFT-spread OFDM) to be applied to each component carrier, and so on, to the user terminal 10. Also, it is equally possible to provide a configuration in which, when the search space starting position is controlled in the user terminal 10 based on information reported from the radio base station apparatus 20, information related to the control algorithm to determine the search space starting position (for example, constant K and so on) is reported to the user terminal 10 by RRC signaling. Then, it is equally possible to provide a configuration to report the fundamental frequency block-specific offset values $n_{CC}$ at the same time by RRC signaling.

On the uplink, the PUSCH, which is used by each user terminal 10 on a shared basis, and the PUCCH, which is an uplink control channel, are used. User data is transmitted by means of this PUSCH. By the PUCCH, downlink CSI (CQI/PMI/RI), ACK/NACK and so on are transmitted. Also, in SC-FDMA, intra-subframe frequency hopping is adopted.

Figure 11:
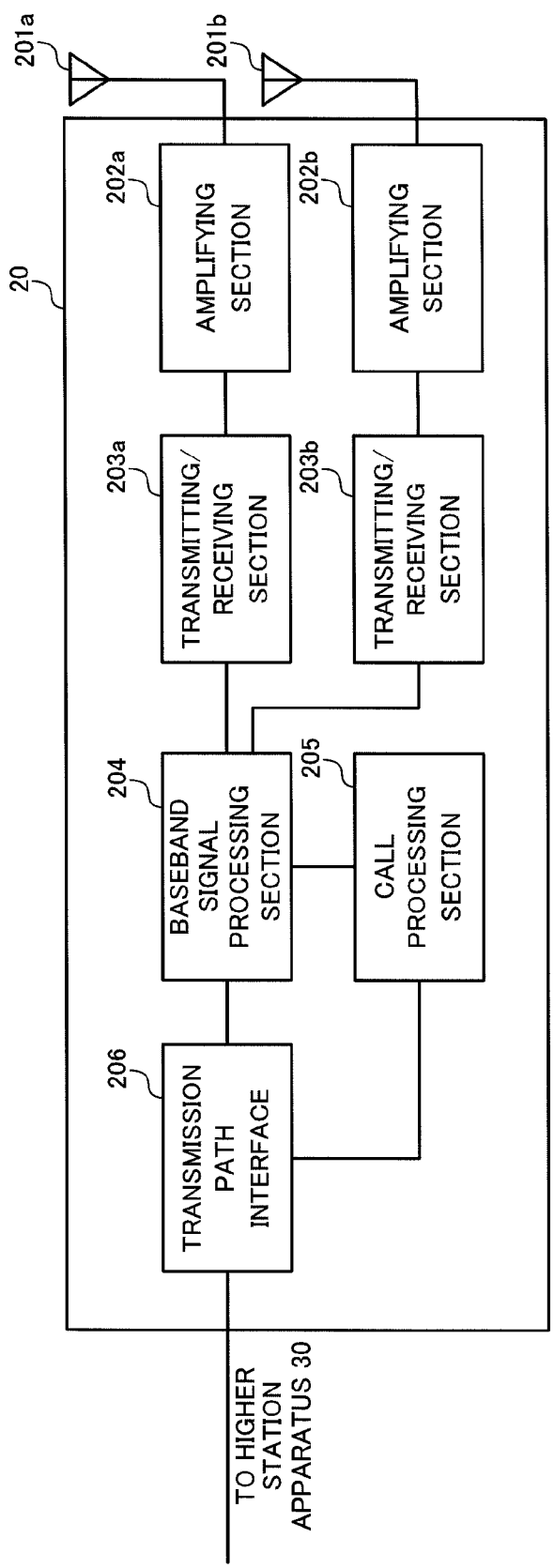
FIG. 11 is a block diagram showing an overall configuration of a radio base station apparatus according to an embodiment of the present invention.

Referring to FIG. 11, an overall configuration of the radio base station apparatus 20 according to the present embodiment will be described. The radio base station apparatus 20 has transmitting/receiving antennas 201a and 201b, amplifying sections 202a and 202b, transmitting/receiving sections 203a and 203b, a baseband signal processing section 204, a call processing section 205, and a transmission path interface 206.

User data that is transmitted from the radio base station apparatus 20 to the user terminal 10 on the downlink is input from the higher station apparatus 30 of the radio base station apparatus 20, into the baseband signal processing section 204, via the transmission path interface 206.

In the baseband signal processing section 204, PDCP layer processes such as adding sequence indices, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process are performed.

The baseband signal processing section 204 reports control information for communication in the cell 50, to the user terminal 10, by a broadcast channel. Broadcast information for communication in the cell 50 includes, for example, the system bandwidth on the uplink and the downlink, identification information of a root sequence (root sequence index) for generating signals of random access preambles of the PRACH, and so on.

In the transmitting/receiving sections 203a and 203b, the baseband signal output from the baseband signal processing section 204 is subjected to frequency conversion into a radio frequency band. The RF signal is amplified in the amplifying section 202 and output to the transmitting/receiving antennas 201a and 201b.

The radio base station apparatus 20 receives the transmission wave transmitted from the user terminal 10 in the transmitting/receiving antennas 201a and 201b. The radio frequency signals that are received in the transmitting/receiving antennas 201a and 201b are amplified in the amplifying sections 202a and 202b, subjected to frequency conversion and converted into baseband signals in the transmitting/receiving sections 203a and 203b, and output to the baseband signal processing section 204.

The baseband signal processing section 204 performs an FFT process, an IDFT process, error correction decoding, a MAC retransmission control receiving process, RLC layer and PDCP layer receiving processes, with respect to user data included in the baseband signal received in uplink transmission. The decoded signal is transferred to the higher station apparatus 30 through the transmission path interface 206.

The call processing section 205 performs call processing such as setting up and releasing communication channels, manages the state of the radio base station apparatus 20 and manages the radio resources.

Figure 12:
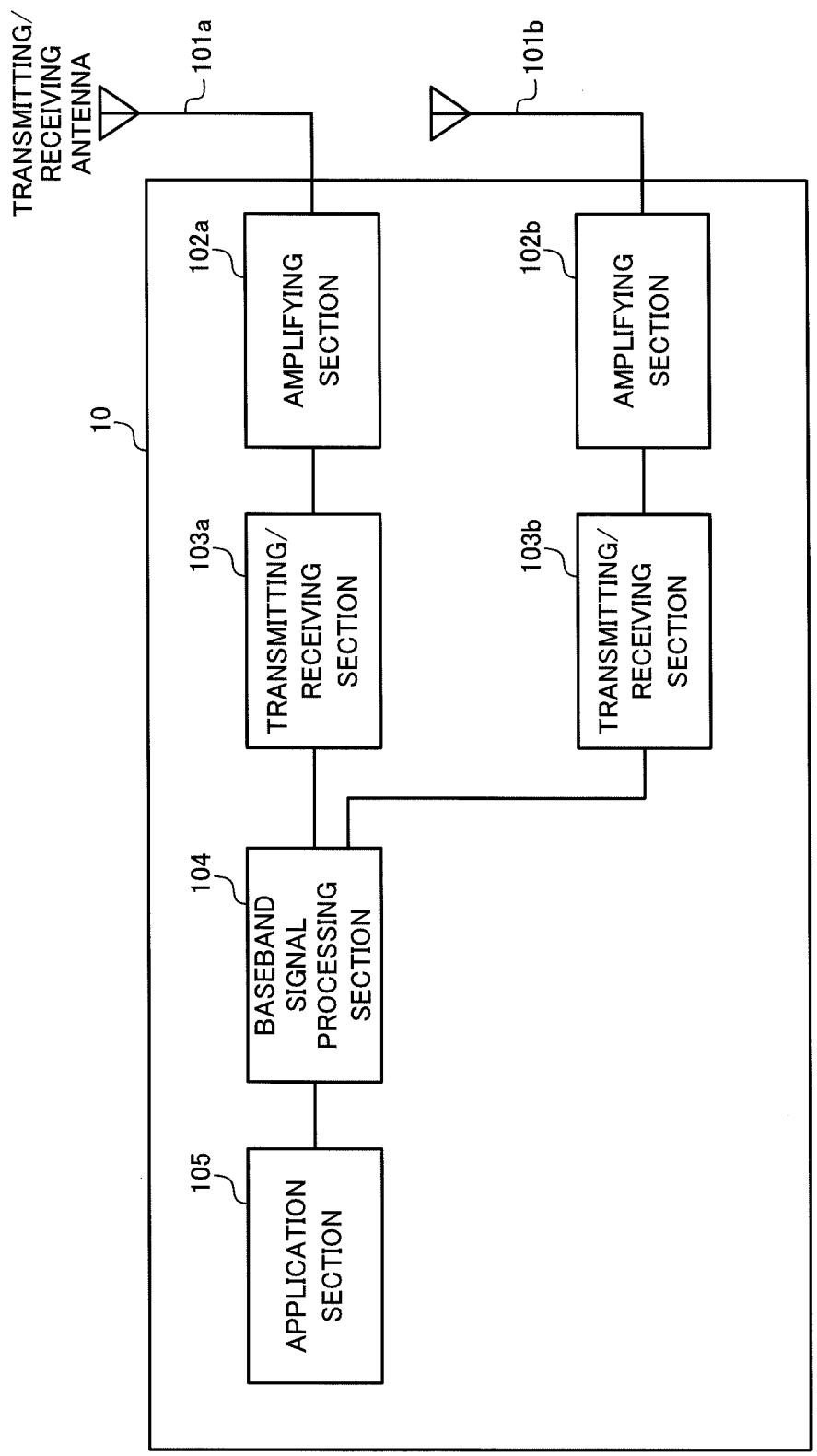
FIG. 12 is a functional block diagram showing an overall configuration of a user terminal according an embodiment of the present invention.

Next, referring to FIG. 12, an overall configuration of a user terminal 10 according to the present embodiment will be described. The user terminal 10 has a plurality of transmitting/receiving antennas 101a and 101b, amplifying sections 102a and 102b, transmitting/receiving sections 103a and 103b, a baseband signal processing section 104, and an application section 105.

Radio frequency signals received in the transmitting/receiving antennas 101a and 101b are amplified in the amplifying sections 102a and 102b, subjected to frequency conversion and converted into a baseband signal in the transmitting/receiving sections 103a and 103b. This baseband signal is subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

On the other hand, uplink user data is input from the application section 105 to the baseband signal processing section 104. The baseband signal processing section 104 performs a retransmission control (HARQ) transmission process, channel coding, a DFT process, and an IFFT process. The baseband signal output from the baseband signal processing section 104 is converted into a radio frequency band in the transmitting/receiving section 103. After that, the signal is amplified in the amplifying sections 102a and 102b and transmitted from the transmitting/receiving antennas 101a and 101b.

Figure 13:
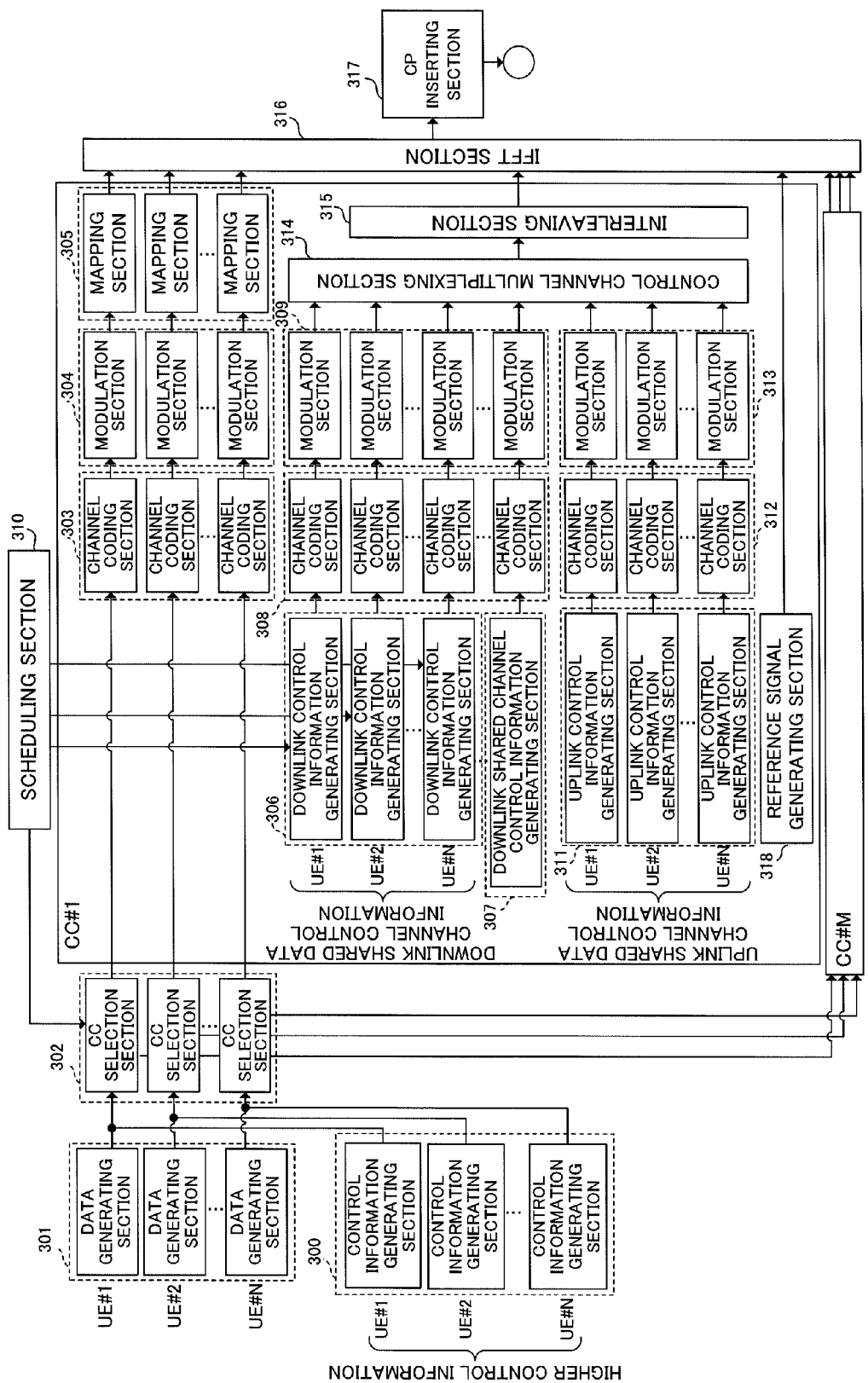
FIG. 13 is a functional block diagram showing a baseband processing section of a radio base station apparatus according to an embodiment of the present invention and part of higher layers.

FIG. 13 is a functional block diagram of the baseband signal processing section 204 in the radio base station apparatus 20 according to the present embodiment and part of the higher layers, and the baseband signal processing section 204 primarily illustrates the function blocks of the transmission processing section. FIG. 13 shows an example of a base station configuration which can support M component carriers (CC #1 to CC #M). Transmission data for user terminals 10 under the radio base station apparatus 20 is transferred from the higher station apparatus 30 to the radio base station apparatus 20.

The control information generating sections 300 generate higher control signals transmitted and received by higher layer signaling (RRC signaling). The higher control signals include allocation information of CIF values and A-CSI trigger field values, which has been described with reference to FIGS. 6, 7, 9. The higher control signals may include commands to request an increase/decrease of component carriers CC. Also, higher control signals may be generated on a per user basis as well.

The data generating sections 301 output transmission data transferred from the higher station apparatus 30 as user data separately.

The component carrier selection sections 302 select component carriers to be allocated to radio communication with the user terminals 10, on a per user basis. As described above, an increase/decrease of component carriers is reported from the radio base station apparatus 20 to a user terminal 10 by RRC signaling, and a message of completion of allocation is received from the user terminal 10. As this application complete message is received, allocation (addition/removal) of component carriers to that user is fixed, and this fixed component carrier allocation is set in the component carrier selection section 302 as component carrier allocation information. In accordance with the component carrier allocation information that is set in the component carrier selection sections 302 on a per user basis, higher control signals and transmission data are allocated to the channel coding sections 303 of the applicable component carriers.

The scheduling section 310 controls allocation of component carriers to the user terminals 10 under control, according to overall communication quality of the system band. The scheduling section 310 determines addition/removal of component carriers to allocate to communication with the user terminals 10. A result determined in relationship to addition/removal of component carriers is reported to the control information generating sections 300. Also, for each user terminal, a primary component carrier (PCC) is determined from the component carriers that are selected. The PCC may be switched dynamically or may be switched semi-statically.

Also, the scheduling section 310 controls resource allocation in each component carrier. Scheduling is separately performed between LTE terminal users and LTE-A terminal users. The scheduling section 310 receives as input transmission data and retransmission commands from the higher station apparatus 30, and also receives as input the channel estimation values and resource block CQIs from a receiving section having measured uplink received signals.

Also, the scheduling section 310 schedules downlink allocation information, uplink allocation information and uplink/downlink shared channel signals, with reference to the retransmission commands, channel estimation values and CQIs that are received as input from the higher station apparatus 30. A propagation path in mobile communication varies differently per frequency, due to frequency selective fading. So, upon user data transmission, resource blocks of good communication quality are allocated to the user terminals 10 on a per subframe basis (which is referred to as "adaptive frequency scheduling"). In adaptive frequency scheduling, a user terminal 10 of good propagation path quality is selected and allocated to each resource block. Consequently, the scheduling section 310 allocates resource blocks, with which improvement of throughput is anticipated, using the CQI of each resource block, fed back from each user terminal 10.

Also, the scheduling section 310 controls the number of CCE aggregations depending on the conditions of the propagation paths with the user terminals 10. The number of CCE aggregations is increased with respect to cell edge users. Also, the MCS (coding rate and modulation scheme) that fulfills a predetermined block error rate with the allocated resource blocks is determined. Parameters that satisfy the MCS (coding rate and modulation scheme) determined by the scheduling section 310 are set in channel coding sections 303, 308 and 312, and modulation sections 304, 309 and 313.

The baseband signal processing section 204 has channel coding sections 303, modulation sections 304 and mapping sections 305 to support the maximum number of users to multiplex, N, in one component carrier. The channel coding sections 303 perform channel coding of the shared data channel (PDSCH), formed with user data (including part of higher control signals) that is output from the data generating sections 301, on a per user basis. The modulation sections 304 modulate user data having been subjected to channel coding, on a per user basis. The mapping sections 305 map the modulated user data to radio resources.

Also, the baseband signal processing section 204 has generating sections (downlink control information generating sections 306 and uplink control information generating sections 311) that generate control information using a predetermined DCI format from a plurality of DCI formats. The plurality of DCI formats include a DCI format having a UL grant as its content (for example, DCI format 0/4), and a DCI format having a DL grant as its content (for example, DCI format 1A and so on).

The downlink control information generating sections 306 generate downlink shared data channel control information for controlling the PDSCH using a DCI format having a DL grant as its content (for example, DCI format 1A and so on). The downlink shared data channel control information is generated on a per user basis. Also, the downlink shared data channel control information includes an identification field (CIF), which identifies an uplink serving cell where the PDSCH is allocated.

The uplink control information generating sections 311 generate uplink shared data channel control information for controlling the PUSCH using a DCI format (for example, DCI format 0/4) containing UL grant as its content. The uplink shared data channel control information is generated on a per user basis. Also, the uplink shared data channel control information includes an identification field (CIF), which identifies an uplink serving cell where the PUSCH is allocated.

Also, the uplink shared data channel control information includes a request field (A-CSI trigger field), which requests aperiodic channel state information (A-CSI). In the A-CSI trigger field, a value may be set depending on whether or not reporting of A-CSI from the user terminal 10 is requested. Furthermore, in the A-CSI trigger field, a value may be set depending on the combination of downlink serving cells, the A-CSI of which needs to be reported from the user terminal 10. For example, when reporting of A-CSI from the user terminal 10 is not required, "00" is set in the A-CSI trigger field, and, when reporting of A-CSI from the user terminal 10 is requested, "01," "10," or "11" may be set, depending on the combination of downlink serving cells, the A-CSI of which needs to be reported from the user terminal 10.

Also, the uplink shared data channel control information may include, for example, an RA flag, the number of resource blocks determined per user terminal and allocation information to show the resource block positions, the modulation scheme, the coding rate, the redundancy version, an identifier to identify between new data and reconstructed data, a PUSCH transmission power control command, a cyclic shift for a demodulation reference signal (CS for DMRS), a CQI request, an A-SRSF, a PMI/RI, and so on.

Also, the baseband signal processing section 204 has a downlink shared control channel control information generating section 307 that generates downlink shared control channel control information, which is downlink control information that is common between users.

Also, the baseband signal processing section 204 has channel coding sections 308 and modulation sections 309 to support the maximum number of users to multiplex, N, in one component carrier. The channel coding sections 308 perform channel coding of control information generated in the downlink control information generating sections 306 and the downlink shared channel control information generating section 307, on a per user basis. The modulation sections 309 modulate the downlink control information after channel coding.

Also, the baseband signal processing section 204 has channel coding sections 312 which performs channel coding of generated uplink shared data channel control information on a per user basis, and modulation sections 313 which modulate the uplink shared data channel control information after channel coding on a per user basis.

The reference signal generating section 318 multiplexes cell-specific reference signals (CRSs), which are used for various purposes such as channel estimation, symbol synchronization, CQI measurement, mobility measurement and so on, on FDM/TDM, in resource blocks (RBs) and transmits these signals. Also, the reference signal generating section 318 transmits downlink demodulation reference signals (UE-specific RSs).

The downlink control information and uplink control information that are modulated in the modulation sections 309 and 313 on a per user basis are multiplexed in the control channel multiplexing section 314 and are furthermore interleaved in the interleaving section 315. A control signal that is output from the interleaving section 315 and user data that is output from the mapping section 305 are input in an IFFT section 316 as downlink channel signals. Also, a downlink reference signal is input in the IFFT section 316. The IFFT section 316 performs an inverse fast Fourier transform of the downlink channel signal and the downlink reference signal and converts frequency domain signals into time domain signals. A cyclic prefix inserting section 317 inserts cyclic prefixes in the time sequence signal of the downlink channel signal. Note that a cyclic prefix functions as a guard interval for cancelling the differences in multipath propagation delay. Transmission data to, which cyclic prefixes have been added, is transmitted to the transmitting/receiving section 20.

Figure 14:
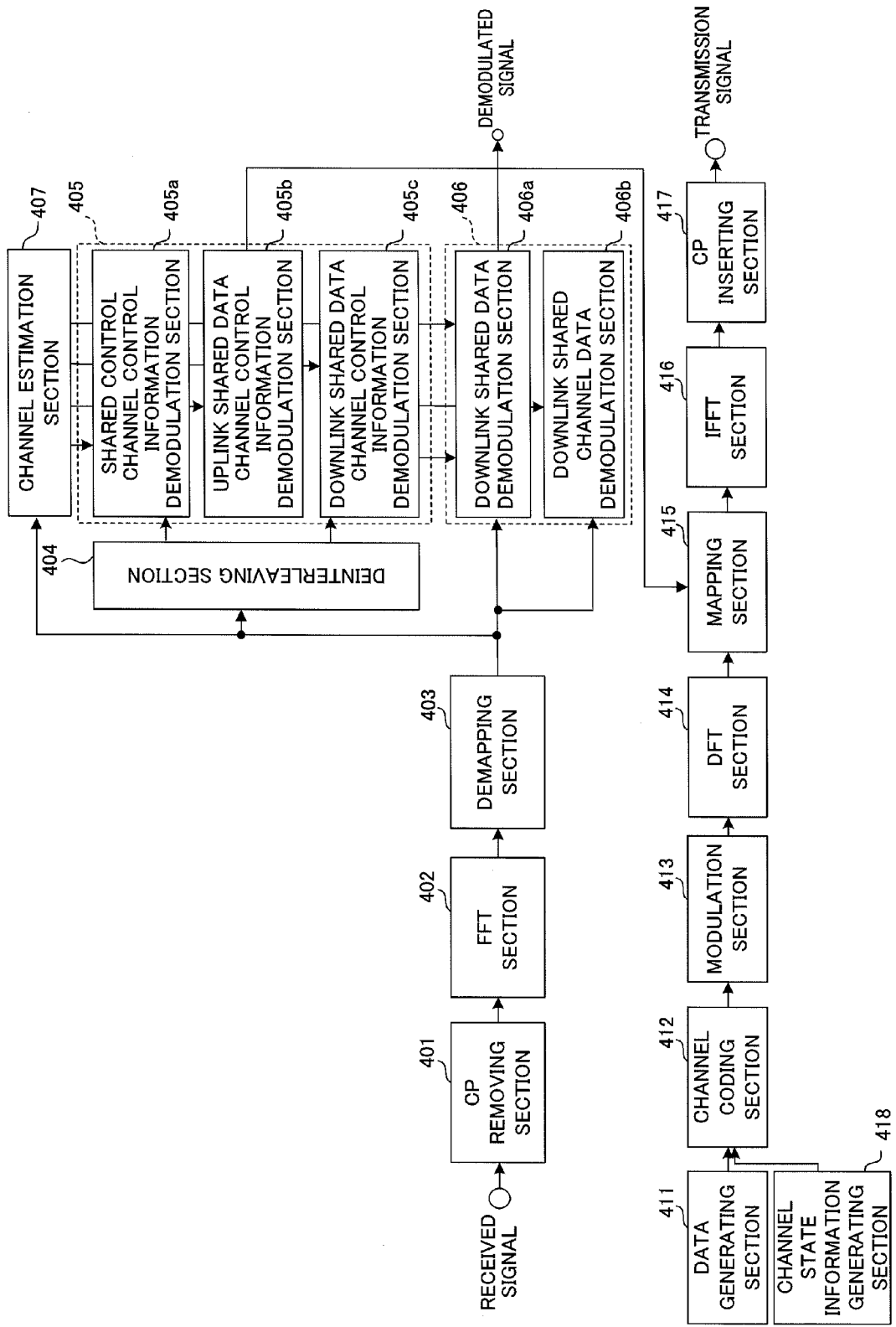
FIG. 14 is a functional block diagram of a baseband processing section of a user terminal according to the first embodiment.

FIG. 14 is a functional block diagram of a baseband signal processing section 104 provided in the user terminal 10, and shows the functional blocks of an LTE-A terminal which supports LTE-A. Note that the user terminal 10 is configured to be able to perform radio communication using a plurality of serving cells of different component carriers (CCs).

A downlink signal that is received as received data from the radio base station apparatus 20 has the CPs removed in a P removing section 401. The downlink signal, from which the CPs have been removed, is input in an FFT section 402. The FFT section 402 performs a fast Fourier transform (FFT) on the downlink signal, converts the time domain signal into a frequency domain signal, and inputs this signal in a demapping section 403. The demapping section 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from an application section 105. The multiplex control information output from the demapping section 403 is deinterleaved in a deinterleaving section 404.

Also, the baseband signal processing section 104 has control information demodulation section 405 that demodulates downlink/uplink control information, data demodulating section 406 that demodulates downlink shared data, and a channel estimation section 407.

The control information demodulation section 405 has a shared control channel control information demodulation section 405a that demodulates downlink shared control channel control information from the downlink control channel, an uplink shared data channel control information demodulation section 405b that performs blind decoding of the search space from the downlink control channel and demodulates uplink shared data channel control information, and a downlink shared data channel control information demodulation section 405c that performs blind decoding of the search space from the downlink control channel and demodulates downlink shared data channel control information.

The data demodulation section 406 includes a downlink shared data demodulation section 406a that demodulates the user data and higher control signals, and a downlink shared channel data demodulation section 406b that demodulates downlink shared channel data.

The shared control channel control information demodulation section 405a extracts shared control channel control information, which is control information that is common between users, by a blind decoding process of the common search space of the downlink control channel (PDCCH), a demodulation process, a channel decoding process and so on. The shared control channel control information includes downlink channel quality information (CQI), is input in a mapping section 415, and is mapped as part of transmission data for the radio base station apparatus 20.

The uplink shared data channel control information demodulation section 405b extracts user-specific uplink shared data channel control information (for example, a UL grant) by, for example, a blind decoding process of the user-specific search space of the downlink control channel (PDCCH), a demodulation process, a channel decoding process and so on. The demodulated uplink shared data channel control information is input in the mapping section 415 and used to control the uplink shared data channel (PUSCH).

The downlink shared data channel control information demodulation section 405c extracts user-specific downlink shared data channel control information (for example, a DL grant) by, for example, a blind decoding process of the user-specific search space of the downlink control channel (PDCCH), a demodulation process, and a channel decoding process. The demodulated downlink shared data channel control information is input in the downlink shared data demodulation section 406 and used to control the downlink shared data channel (PDSCH).

The downlink shared data modulation section 406a acquires user data and higher control information based on downlink shared data channel control information that is input from the downlink shared data channel control information demodulation section 405c. The higher control information (including mode information) is output to a channel estimation section 407. The downlink shared channel data demodulation section 406b demodulates downlink shared channel data based on the uplink shared data channel control information that is input from the uplink shared data channel control information demodulation section 405b.

The channel estimation section 407 performs channel estimation using user terminal-specific reference signals or common reference signals. The estimated channel variation is output to the shared control channel control information demodulation section 405a, the uplink shared data channel control information demodulation section 405b, the downlink shared data channel control information demodulation section 405c and the downlink shared data demodulation section 406a. In these demodulation sections, demodulation processes are performs using the estimated channel variation and the demodulation reference signals.

The baseband signal processing section 104 has, as functions blocks of the transmission system, a data generating section 411, a channel coding section 412, a modulation section 413, a DFT section 414, a mapping section 415, an IFFT section 416, a CP inserting section 417, and a channel state information generating section 418.

The data generating section 411 generates transmission data from bit data that is received as input from the application section 105. The channel coding section 412 performs channel coding processes such as error correction to the transmission data, and the modulation section 413 modulates the transmission data after channel coding by QPSK and so on. The DFT section 414 performs a discrete Fourier transform of the modulated transmission data. The mapping section 415 maps the frequency components of the data symbols after the DFT to subcarrier positions designated by the radio base station apparatus 20. The IFFT section 416 converts the input data, which corresponds to the system band, into time sequence data by performing an inverse fast Fourier transform, and the CP inserting section 417 inserts cyclic prefixes in the time sequence data in data units.

The channel state information generating section 418 generates channel state information (CSI (CQI/PMI/RI)) periodically or aperiodically, based on the UL grant demodulated in the uplink shared data channel control information demodulation section 405b.

To be more specific, when the A-CSI trigger field of the UL grant requests reporting of aperiodic channel state information (A-CSI), the channel state information generating section 418 generates A-CSI. Also, when a user terminal 10 performs radio communication using a plurality of serving cells, for example, as has been described with reference to FIG. 6, FIG. 8, and FIG. 10, the channel state information generating section 418 generates A-CSI of at least one downlink serving cell that is designated by a combination of the CIF and the A-CSI trigger field.

Note that the serving cells to be allocated to each value of the CIF and the A-CSI trigger field (see FIG. 6, FIG. 8 and FIG. 10) may be reported in advance from the radio base station 20 to the user terminals 10 by higher control signals (for example, RRC signaling), or may be set in the user terminals 10 on a fixed basis.

Also, the embodiment disclosed herein is only an example in all respects, and this embodiment is by no means limiting. The scope of the present invention is defined not only by the descriptions of the above embodiment and also is set by the claims, and covers all the modifications and alterations within the meaning and range equivalent to the claims.

The disclosure of Japanese Patent Application No. 2011-029142, filed on Feb. 14, 2011, including the specification, drawings and abstract, is incorporated herein by reference in its entirety.

The invention claimed is:

1. An aperiodic channel state information reporting method comprising the steps of:
transmitting, from a radio base station apparatus to a user terminal, via a downlink control channel, an uplink scheduling grant, which includes an identification field that identifies an uplink serving cell where an uplink shared channel is allocated among a plurality of uplink serving cells and a request field that requests reporting of aperiodic channel state information from the user terminal; and
when both the identification field and the request field correspond to at least one downlink serving cell to be a target for aperiodic channel state information reporting and the uplink serving cell to be used for the aperiodic channel state information reporting, reporting aperiodic channel state information of at least one downlink serving cell designated by a combination of both the identification field and the request field included in the uplink scheduling grant, from the user terminal to the radio base station apparatus, via an uplink shared channel, wherein,
when the uplink shared channel is allocated to the uplink serving cell identified by the identification field, the radio base station apparatus designates at least one downlink serving cell, aperiodic channel state information of which needs to be reported from the user terminal, using the request field;
wherein the request field comprises at least two bits and different downlink serving cells are designated by the same request field.

2. The aperiodic channel state information reporting method according to claim 1, wherein the radio base station apparatus designates at least one uplink serving cell, among the plurality of uplink serving cells, redundantly, using the identification field.

3. The aperiodic channel state information reporting method according to claim 2, wherein the radio base station apparatus designates an uplink serving cell of a primary component carrier of the user terminal, among the plurality of uplink serving cells, redundantly, using the identification field.

4. The aperiodic channel state information reporting method according to claim 2, wherein the radio base station apparatus designates two or more uplink serving cells, among the plurality of uplink serving cells, redundantly, using the identification field.

5. A radio base station apparatus comprising:
a processor configured to generate an uplink scheduling grant, which includes an identification field that identifies an uplink serving cell where an uplink shared channel is allocated among a plurality of uplink serving cells and a request field that requests reporting of aperiodic channel state information from a user terminal, via a downlink control channel; and
a transmission section configured to transmit the uplink scheduling grant to the user terminal via a downlink control channel,
wherein, when both the identification field and the request field correspond to at least one downlink serving cell to be a target for aperiodic channel state information reporting and the uplink serving cell to be used for the aperiodic channel state information reporting, the processor designates at least one downlink serving cell, aperiodic channel state information of which needs to be reported from the user terminal, by a combination of both the identification field and the request field included in the uplink scheduling grant, and when the uplink shared channel is allocated to the uplink serving cell identified by the identification field, the processor is configured to designate at least one downlink serving cell, aperiodic channel state information of which needs to be reported from the user terminal, using the request field;

wherein the request field comprises at least two bits and different downlink serving cells are designated by the same request field.

6. The radio base station apparatus according to claim 5, wherein the processor is configured to designate at least one uplink serving cell, among the plurality of uplink serving cell, redundantly, using the identification field.

7. The radio base station apparatus according to claim 5, wherein the radio base station apparatus is configured to designate an uplink serving cell of a primary component carrier of the user terminal, among the plurality of uplink serving cells, redundantly, using the identification field.

8. The radio base station apparatus according to claim 7, wherein the processor is configured to designate two or more uplink serving cells, among the plurality of uplink serving cells, redundantly, using the identification field.

9. A user terminal comprising:
a receiving section configured to receive, from a radio base station apparatus, via a downlink control channel, an uplink scheduling grant which includes an identification field that identifies an uplink serving cell where an uplink shared channel is allocated among a plurality of uplink serving cells and a request field that requests reporting of aperiodic channel state information from the user terminal; and when both the identification field and the request field correspond to at least one downlink serving cell to be a target for aperiodic channel state information reporting and the uplink serving cell to be used for the aperiodic channel state information reporting, a transmission section is configured to report the aperiodic channel state information of at least one downlink serving cell designated by a combination of both the identification field and the request field included in the uplink scheduling grant, via the uplink shared channel, wherein, when the uplink shared channel is allocated to the uplink serving cell identified by the identification field, the radio base station apparatus designates at least one downlink serving cell, aperiodic channel state information of which needs to be reported from the user terminal, using the request field;

wherein the request field comprises at least two bits and different downlink serving cells are designated by the same request field.

* * * * *